Jan. 20, 1942.    C. A. NERACHER ET AL    2,270,545
FLUID COUPLING DRIVE
Filed Jan. 11, 1940
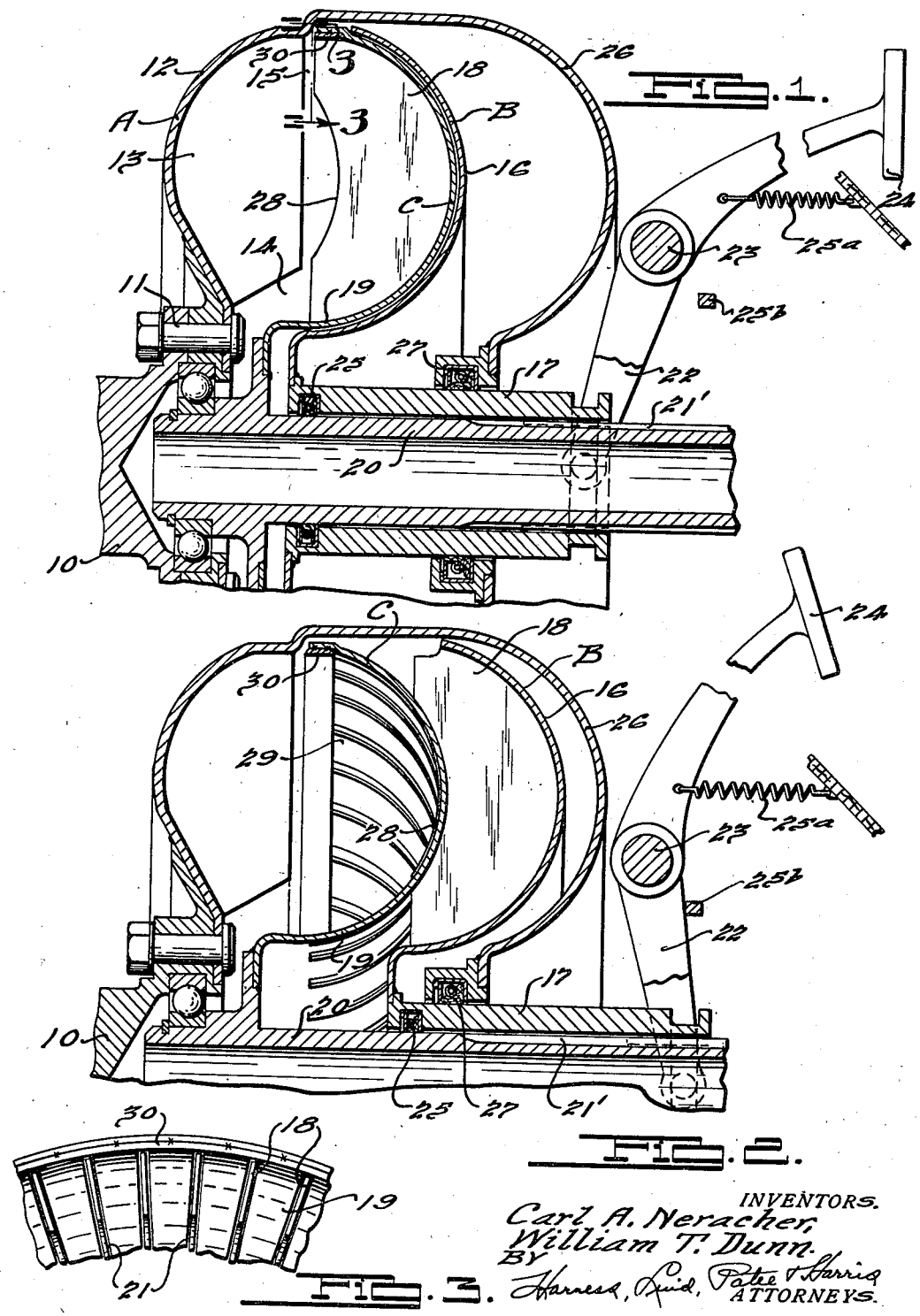
INVENTORS.
Carl A. Neracher,
William T. Dunn.
BY
Harness, Dickey, Pierce & Harris
ATTORNEYS.

Patented Jan. 20, 1942

2,270,545

UNITED STATES PATENT OFFICE 2,270,545

FLUID COUPLING DRIVE

Carl A. Neracher and William T. Dunn, Detroit, Mich., assignors to Chrysler Corporation, Highland Park, Mich., a corporation of Delaware Application January 11, 1940, Serial No. 313,382

2 Claims. (Cl. 60—54)

This invention relates to fluid coupling drives and refers more particularly to improvements in controlling the drive between driving and driven members of such couplings.

Fluid couplings are used in transmitting power in a wide variety of machines. One such use, by way of example, relates to motor vehicle installation wherein a fluid coupling has known advantages in transmitting drive from the engine to the driving ground wheels of the vehicle. Inasmuch as a motor vehicle installation is typical of the wide variety of uses to which our invention may be put, we will for the most part describe certain fundamentals of this type of installation from which it will be apparent that our invention will have corresponding advantages in any equipment having to do with fluid drives, fluid clutching, and the like.

In motor vehicles employing a fluid coupling, it is desirable to, at times, break or so reduce the drive connection from the engine to the vehicle such that when the vehicle is standing and the engine running, the car will not "creep." Various attempts have been made to meet this condition such as by providing an ordinary friction clutch ahead of or behind the fluid coupling, or by providing a transmission operable to afford a neutral condition on stopping the car. Such methods lead to expense and complication and for many reasons are not always desirable especially when used with standard commercial types of transmissions which require or make advisable the provision of some means to fully unload the transmission input shaft at the time of "shifting gears."

With the foregoing in mind it is an object of our invention to provide simple and effective means for overcoming the aforesaid objections by rendering the fluid coupling inoperable or for rendering the fluid coupling partially operable to any desired degree.

Another object of our invention is to provide a fluid coupling having relatively movable coupling members to mask or partially mask at least one of the sets of coupling vanes to render the effective fluid drive inoperable to any desired degree.

It has heretofore been proposed to shift one of the coupling members axially relative to the other for the intended purpose of breaking the drive but such arrangement is not satisfactory because the fluid will nevertheless jump the gap between the coupling members making it impossible to eliminate drive between the members as long as the impeller is running. With our invention all circulation between the vanes of the impeller and runner may be eliminated.

Further objects and advantages of our invention will be more apparent from the following description of one embodiment thereof, reference being had to the accompanying drawing in which:

Fig. 1 is a sectional elevational view through the fluid coupling showing the coupling parts in their normal operating positions.

Fig. 2 is a similar view showing the coupling parts positioned to interrupt drive therebetween.

Fig. 3 is a detail elevational view taken as indicated by line 3—3 of Fig. 1.

In the drawing reference character 10 is the driving shaft, herein illustrated as the rear end portion of an engine crankshaft. The fluid coupling impeller A is driven from shaft 10 and may for this purpose be directly mounted on said shaft by fasteners 11.

The fluid coupling is in general of the well known kinetic type comprising multiple vaned passages for circulating the fluid between the impeller and runner. Thus, impeller A has an annular dished cover 12 from which the radial vanes 13 extend to define impeller passages which receive fluid from the runner at transfer zone 14 and which direct the fluid at zone 15 to drive the runner.

The runner B has associated therewith a masking structure C. The runner B comprises an annular dished cover 16 mounted on a sleeve 17 and formed with vanes 18 forming runner passages generally similar to the impeller passages. The mask C comprises a dished cover 19 mounted on the axially fixed driven shaft 20, this cover being shaped to fit within cover 16 with the parts positioned as in Fig. 1. The cover 19 is formed with a plurality of radially extending circumferentially spaced slots respectively slidably fitting the vanes 18.

The fluid coupling comprising impeller A and runner B are of general toroidal form, the impeller and runner comprising hemi-toroidal portions. This form of fluid coupling presents many difficulties, largely because of the shape, in controlling the fluid flow between the vanes of the impeller and runner.

The sleeve 17 is splined at 21' on the driven shaft 20 and is axially shiftable to adjust the runner B between its Fig. 1 and Fig. 2 positions by a lever operator 22 adapted to be rocked about shaft 23 by any suitable power or manually applied means. One manner of operating the lever 22 is to connect the same to what is ordinarily the vehicle clutch pedal 24 so that when the pedal is fully depressed the runner is moved to its Fig. 2 position. Sleeve 17 is sealed at 25 against escape of fluid. Spring 25ᵃ returns pedal 24 and a stop 25ᵇ limits its operated stroke.

The cover 12 has an annular shrouding extension 26 dished to receive cover 16 as in Fig. 2 and extended inwardly for sealing at 27 against fluid leak.

In order to reduce the movement of runner B to a fully masked position and at the same time insure continued engagement at all times of vanes 18 with slots 21, the forward or inner edges of vanes 18 are recessed at 28 intermediate zones 14 and 15 so that in the Fig. 2 position no portion of the vanes 18 project within the chamber 29 of the mask C. But for the recess 28 in vanes 18 the runner B would have to be moved considerably further rearwardly from the Fig. 2 position to fully mask vanes 18 by cover 19 and then there would be danger of losing the engagement of vanes 18 in slots 21.

In the operation of the device, with the parts positioned as in Fig. 1, the fluid coupling operates in conventional manner in transferring a slip drive between shafts 10 and 20. When it is desired to break the drive to entirely disconnect shaft 20 from shaft 10, pedal 24 is depressed to thereby shift runner B to the Fig. 2 position. Under such conditions the fluid circulates from impeller A to the chamber 29 but mask C prevents the fluid from acting on the runner vanes 18 so that the runner is fully unloaded.

It will be apparent that if the pedal 24 is only partially depressed less than its full stroke, the runner B will be correspondingly shifted to a partially masked position and in this manner any desired degree of slip may be provided in the drive through the coupling. This arrangement also insures a smooth pick-up or clutching action when pedal 24 is released especially where the impeller speed is then relatively high. As both the mask C and runner B are arranged for connection to shaft 20, the vanes 18 are not required to drive shaft 20 through slots 21 and therefore the shift of runner B may be easily made.

Because of the slotting of the hemi-toroidal mask C for slidably receiving the runner vanes 18, we may provide an annular reinforcing band 30 for the outer edge of housing 19. In Fig. 1 the vanes 18 are terminally disposed within this band 30 when the housing 19 is nested within housing 16.

We claim:

1. A fluid coupling comprising cooperable fluid-circulating relatively rotatable vane-carrying structures each having an annular dished support, a third structure comprising a slotted annular dished structure nesting within the dished support of one of the first said structures with the vanes thereof projecting through the slots of said third structure, and means for connecting said one and third structures together to prevent their relative rotation while accommodating their relative displacement in the direction of the axis of rotation of said one structure, said connecting means being adapted to maintain the slots of said third structure substantially free from torque-transmitting relationship with respect to the vanes of said one structure.

2. A fluid coupling comprising coaxial relatively rotatable impeller and runner structures each having a plurality of vanes defining fluid conducting passages, one of said structures being adapted for displacement in the direction of the axis of rotation of said structures from a normal position providing fluid circulating cooperation with said other structure to a second position, a mask having a plurality of slots arranged to slidably receive the respective vanes of said displaceable structure, said mask being so disposed as to reduce circulation of fluid between the vane passages of said structures when said displaceable structure is displaced to its said second position, and means providing a drive connection between said mask and said displaceable structure, said drive connection being so constructed and arranged as to maintain said slots out of torque transmitting relation with respect to the vanes of said displaceable structure and thereby facilitate said displacement of said displaceable structure.

CARL A. NERACHER.
WILLIAM T. DUNN.